United States Patent Office 3,288,898
Patented Nov. 29, 1966

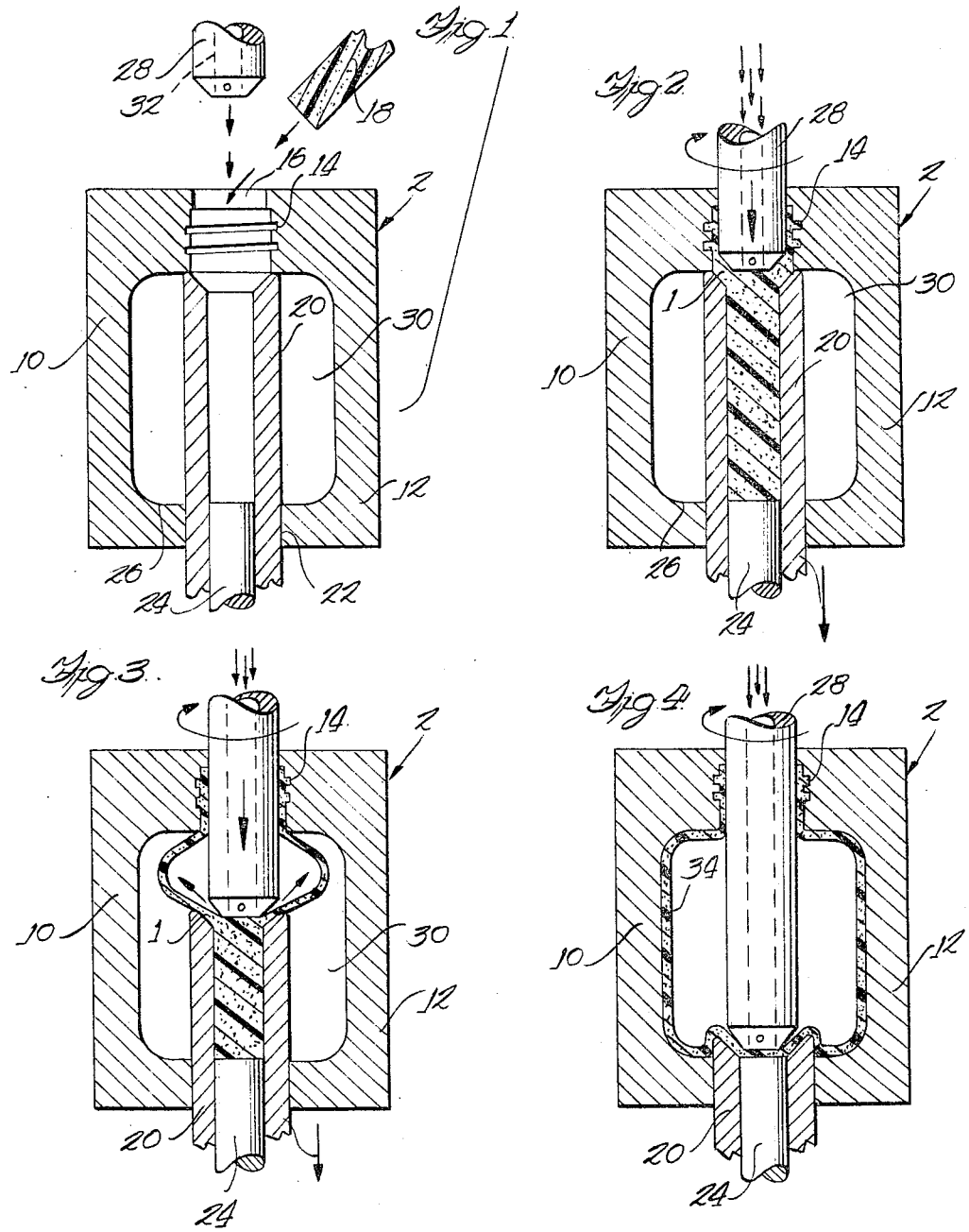

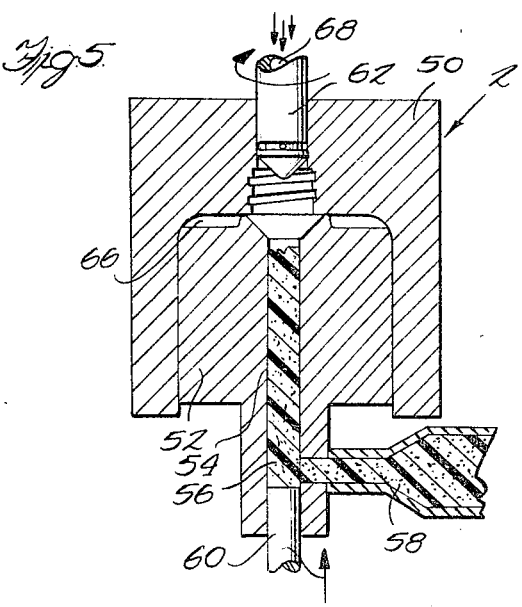
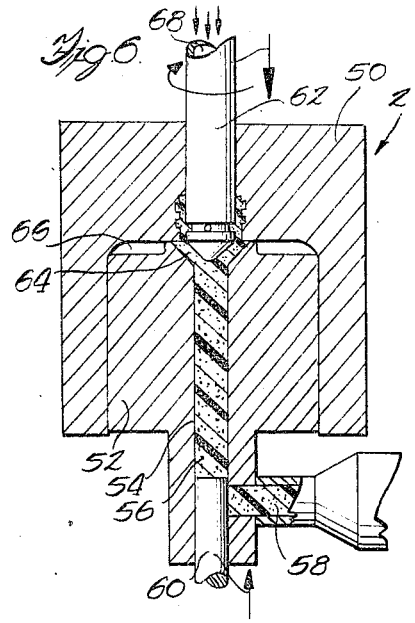
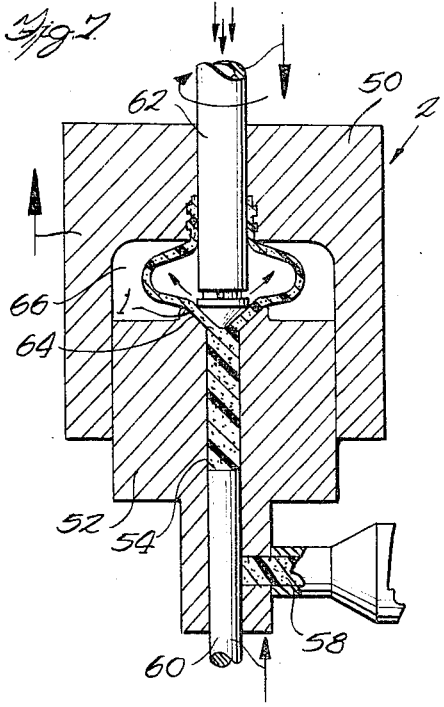
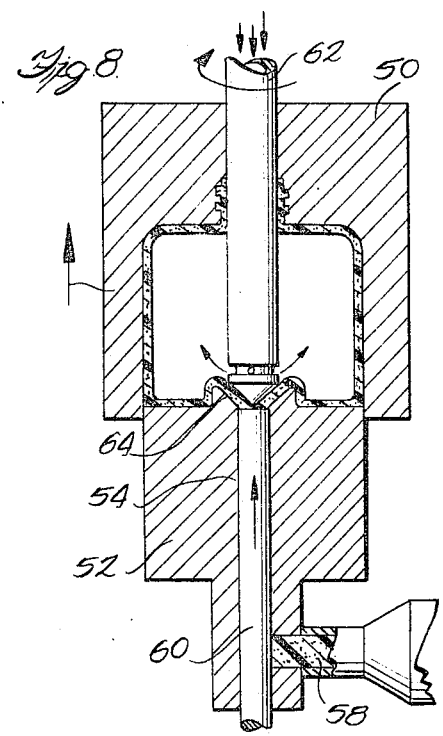

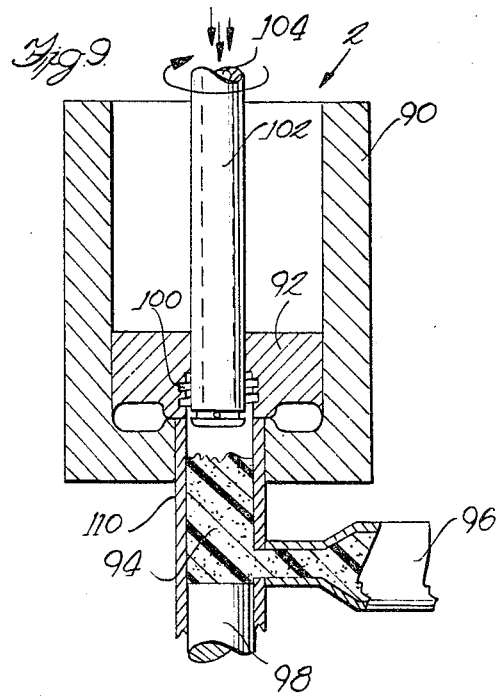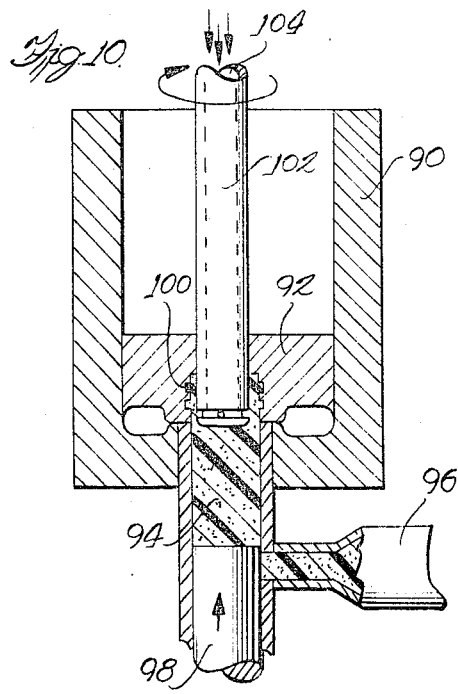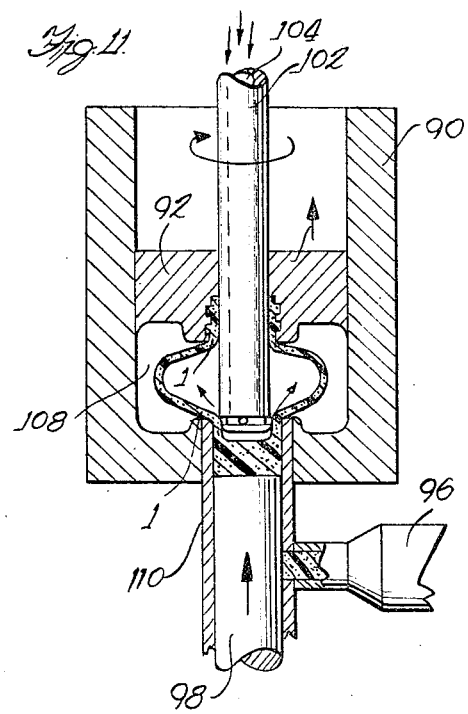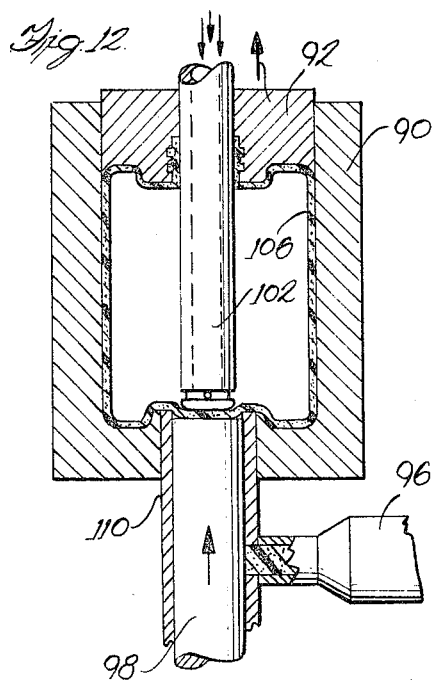

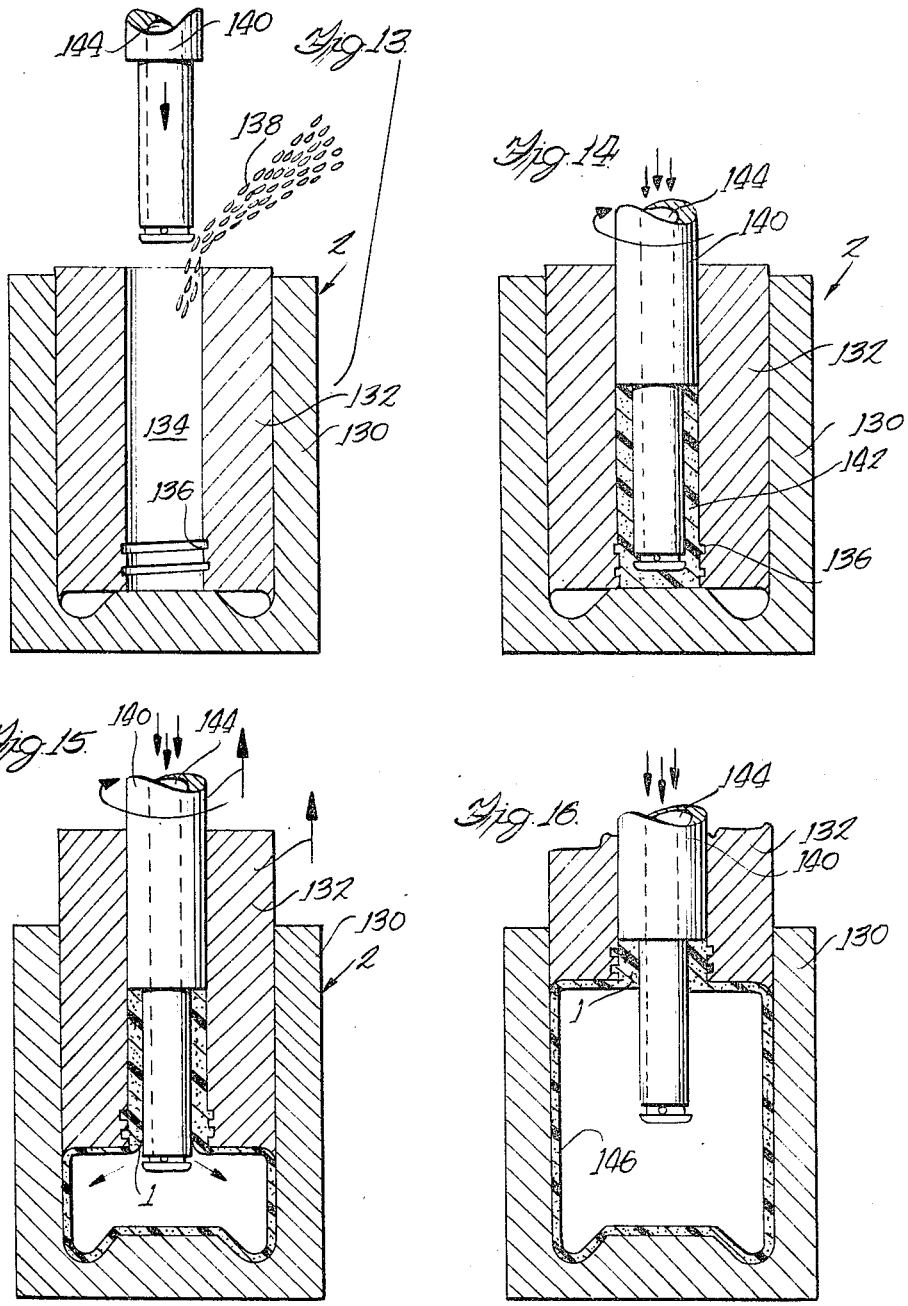

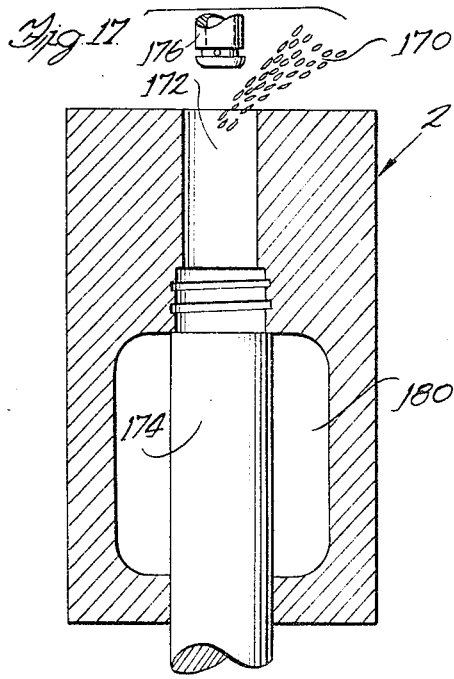
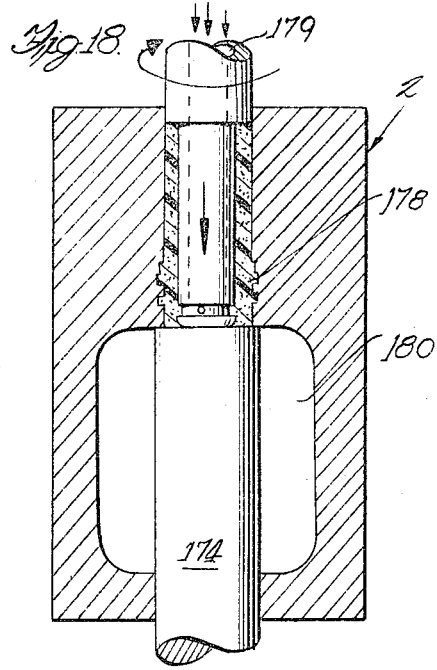
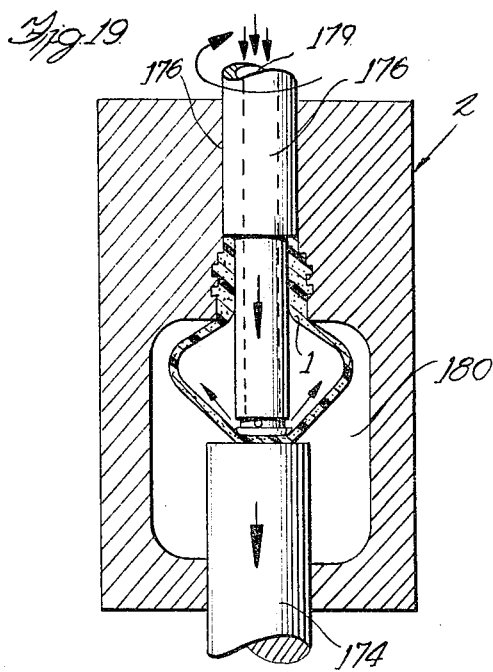
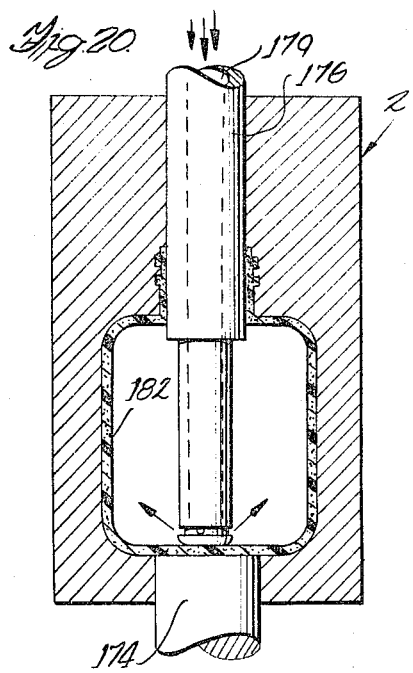

3,288,898
PROCESS OF BLOW MOLDING HOLLOW ARTICLES
Walter H. West, Bay City, Mich., assignor to The Dow
Chemical Company, Midland, Mich., a corporation of
Delaware
Filed Nov. 13, 1963, Ser. No. 323,406
7 Claims. (Cl. 264—98)

This invention relates to a novel blow molding method and apparatus and more particularly to a method and an apparatus for blow molding hollow articles, such as bottles, jars, doll heads and bodies, and the like of thermoplastic whereby multidirectional orientation is imparted to the molecules of said thermoplastic for multidirectional strength.

In conventional blow molding techniques for forming hollow articles of plastic, a relatively thickwalled tube is first extruded. Then the tube, or parison, as it is termed in the trade, is clamped at both ends within a mold whose cavity conforms to the article to be blown. It is then heated and blown until it conforms to the mold walls.

Variations on this technique exist but in each instance there is some technological difficulty. For example, the technique which requires the separate forming of a cup-shaped parison prior to blowing increases the processing steps and time, and the amount of molding equipment needed. The technique which requires reheating of the parison prior to blowing necessitates additional heat and close temperature control. Where the technique involves clamping, a flash-trim operation is frequently needed to provide an attractive finished article. Overriding all of these technological difficulties is the problem of imparting multidirectional strength to the molded article. Unfortunately, blow molding does not impart sufficient orientation to the molecules of the thermoplastic being used. The blown article is weak in the hoop direction so that vertical cracking frequently occurs during use of the article.

An object of this invention is to provide a novel blow molding technique and apparatus therefor.

Another object of this invention is to provide a blow molding technique which imparts a multiaxial orientation to the blown article.

Still another object is to provide a blow molding technique which is operative at milder temperature conditions.

Another object is to provide a blow molding technique which may utilize the heat of extrusion of the parison for blowing.

A further object is to provide a blow molding technique which may utilize a parison in a solid state.

A still further object is to provide a blow molding technique which may utilize a parison formed of discrete particles of polymers.

Another object is to provide a blow molding technique which has relatively little flash so that finish trimming is avoided.

Another object is to provide a blow molding technique which is fast.

Another object is to provide apparatus in a blow mold in which extrusion as well as blow molding can be performed.

Another object is to provide blow mold apparatus which automatically imparts multiaxial orientation to the finished article.

Another object is to provide blow mold apparatus which is relatively simple in structure.

Another object is to provide a blow mold apparatus which does not have long flow areas to deleteriously affect the flow.

Another object is to provide blow mold apparatus which operates under relatively cold temperature conditions.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which:

FIGS. 1 through 4 are cross-sectional schematic views of one embodiment of apparatus for blow molding a plastic bottle arranged to show the sequential order of operation.

FIGS. 5 through 8 are cross-sectional schematic views of another embodiment of the blow mold apparatus similarly arranged to show the sequential order of operation.

FIGS. 9 through 12 are cross-sectional schematic views of still another embodiment of the blow mold apparatus.

FIGS. 13 through 16 are cross-sectional schematic views of another embodiment of the blow mold apparatus, and FIGS. 17 through 20 are cross-sectional schematic views of another embodiment of the blow mold apparatus.

Similar reference characters refer to similar parts throughout the several views of the drawings.

As seen in the several sets of schematic views of the drawings, it has been found that an improved blow molded plastic article can be produced by extruding plastic through an annular die orifice, one lip of which is rotating with a level of torque sufficient to impart molecular orientation to the extruded plastic, and immediately blowing the extruded plastic out to conform to the surrounding walls of the blow mold cavity.

More particularly, it has been found that exceptional strength is imparted to a blow molded article by causing molecular orientation of the plastic prior to blowing. This is accomplished by extruding the raw plastic through an annular die orifice 1 in the drawings while one element of said orifice is being rotated with a level of torque sufficient to impart orientation to the molecules of the plastic being extruded. As soon as the plastic leaves the extrusion orifice, it is blown into the shape defined by the cavity of the mold, a bottle mold 2 in the drawings, which surrounds the orifice. There is no solidification of the plastic between the extrusion and the blowing step so that in essence a singular extrusion-blowing process occurs. This permits use of raw plastic in a solid, granular or fluid form. The several embodiments shown in the drawings illustrate each such use.

The apparatus illustrated in FIGS. 1 through 4 permits use of a solid rod-like parison preferably in a heated state. It consists of a bottle mold 2 which in this instance consists of a left and a right mold element 10 and 12, respectively, parting on a center line (not shown) and having a threaded neck portion 14 within the entrance port 16 of the cavity when the elements are in abutting relationship. A solid rod 18 of thermoplastic material in this instance can be used as the parison. It is inserted through port 16 into the cavity of parison cylinder 20. Cylinder 20 is reciprocally mounted within bottle mold 2 through lower parison cylinder port 22 within mold 2. Plug 24 within parison cylinder 20 acts as a floor support for the parison, and as shown in FIG. 2, its top level coincides with the bottom level 26 of the bottle mold 2.

Next, in the sequence of operation, blow plunger 28 descends and, by reason of the force or pressure behind it, and the temperature of the parison which is preferably near the melting temperature of the thermoplastic prior to insertion into the parison cylinder 20, it extrudes the parison outwardly as illustrated in FIG. 2, so that the upper level of the parison expands against the threaded neck section 14 of the bottle mold 2 and then the balance of the parison is extruded outwardly through an annular die orifice 1, formed between the plunger 28 and the upper edge of parison cylinder 20.

At the same time compressed air or gas is forced into the cavity 30 of the mold via air passageway 32 within plunger 28 to blow the extruded portion of the parison outwardly. Simultaneous with downward movement of the blow plunger 28, the parison cylinder also travels downwardly at the same relative speed so that the die orifice 1 retains its original annular dimension. Also, during movement of the blow plunger 28, it is rotated with a level of torque sufficient to impart orientation to the molecules of the plastic being extruded. The outward blowing of the extruded portion of the parison, as the rotating plunger travels downwardly, further causes longitudinal strain upon the molecules with the net result that a fully oriented blown bottle 34 having multiaxial orientation is produced.

Downward movement of the blow plunger 28 and the parison cylinder 20 terminates when both reach the bottom of the bottle mold, as seen in FIG. 4. As shown, a disk-shaped concave depression will be formed in the bottle. If other configurations are used for the die orifice, a flat bottomed bottle, a round concave bottomed bottle or other bottom shapes will be produced. Anyway, at this point, the blown bottle is fully formed and by retracting the blow plunger 28 and opening the bottle mold 2, the finished bottle can be removed.

The bottle so formed has multiaxial orientation in the longitudinal and latitudinal directions so that it has great strength. In addition, trimming of the neck, body or bottom of the bottle is avoided due to the method of forming utilized.

FIGS. 5 through 8 illustrate a variation of the method utilized in FIGS. 1 through 4. Instead of a solid rod-like parison, the apparatus shown permits use of a liquid parison which is extruded directly into the blow mold cavity of the bottle mold 2. In this embodiment, the bottle mold consists of reciprocal cylinder 50 of inverted cup-shaped configuration. If desired, it can be formed of two half round shells to facilitate removal of the finished bottle.

Within the cylinder 50 is a stationary parison cylinder 52 which also acts as a bottle mold piston. Within the center of the parison cylinder 52 is a parison cavity 54 into which molten plastic 56 is first extruded from extruder 58. After such extrusion, parison piston 60 advances the parison 56, in molten form, to an annular die orifice 1 which, in this embodiment, is formed between parison cylinder 52 and blow plunger 62. This causes extrusion of the molten plastic out through the orifice 1 into bottle mold cavity 66. As such extrusion occurs, compressed air or gas is supplied via air passageway 68 in plunger 62 to the center of the orifice extruded parison where the air or gas blows the plastic outwardly to eventually conform to the walls of the bottle mold cavity 66.

Commencing with the extrusion of the parison through the die orifice 1, cylinder 50 moves upwardly. Also, the clearance between parison cylinder 52 and blow plunger 62 is maintained uniform to avoid any change in die orifice dimension whereby non-uniform walls in the blown bottle will be formed. In addition, the blow plunger 62 is provided with a rotational force of a torque level sufficient to impart multiaxial orientation to the molecules of the plastic being blown into bottle shape.

It should be evident that dependent upon the length of upward stroke of the bottle mold cylinder 50, various height bottles can be formed. Thus, by appropriate setting of the vertical stroke of the bottle mold cylinder 50, one can automatically produce different sized bottles. Due to formation of the bottle neck as shown, there is no trim problem. Also, unique multidirectional strength has been imparted to the formed bottle by rotating the blow plunger 62 during extrusion. It is also conceivable to construct the apparatus shown to provide for rotation of the parison cylinder 52 instead of the blow plunger whereby a like orientation of the molecules of the plastic will be effected.

FIGS. 9 through 12 illustrate still another variation of method and apparatus, particularly with respect to the apparatus shown in FIGS. 5 to 8. Like the method illustrated in FIGS. 5 to 8, it too involves the use of a molten parison.

The apparatus consists of the usual bottle mold 2, but here it takes the form of a cup-shaped cylinder 90 within which bottle mold piston 92 reciprocates.

A molten parison 94 is first extruded via extruder 96 into the cavity of a parison cylinder 110. Then parison piston 98 extrudes the parison into the bottle mold cavity, as in the apparatus described above. Here again, the extruded plastic first conforms to the bottle thread section 100 within the bottle mold piston 92 (FIG. 10). Then, as the balance of the parison is extruded through die orifice 1 (see FIG. 11), the bottle mold piston 92 travels upwardly. During such movement, the blow plunger 102 supplies air under pressure, via air passageway 104, to the molten parison to blow into a bottle 106 whose shape conforms to the mold cavity 108 (see FIG. 12). Again, at all times, the clearance between the blow plunger 102 and parison cylinder 110 is maintained uniformly to provide a uniform annular orifice 1. In addition, the blow plunger is continuously rotated with a specific level of torque sufficient to provide a strain upon the molecules of the molten plastic to impart multidirectional orientation thereto.

A trimless plastic bottle with multidirectional strength is formed using the above apparatus and process.

With the arrangement shown in FIGS. 9 through 12, it is also possible, as in FIGS. 5 to 8, to form bottles of various heights, dependent upon the range of travel of the bottle mold piston 92, and by the height of bottle mold cylinder 90.

FIGS. 13 through 16 illustrate still another embodiment of the apparatus and method. Here, a powdered or granulated polymer raw material is utilized to form the parison which is subsequently extruded to form the bottle by blow molding the extrudate.

As illustrated, the apparatus consists of a blow mold 2 with a cup-shaped cylinder 130 and bottle mold piston 132 within its cavity. The piston contains a parison forming cavity 134 within its axial region. The lower end of the cavity has a threaded neck section 136 for the bottle to be blown.

Granulated polymer 138 is first poured into the cavity 134. Then the blow plunger 140 first descends with great pressure to impact mold the granulated polymer into a cup-shaped parison 142 (see FIG. 14). Such impact molding causes the polymer of the parison to have a fluid-like consistency.

Now, after formation of the parison 142, bottle mold piston 132 and blow plunger 140 move upwardly (compare FIGS. 15 and 16), however, the blow plunger 140 moves upwardly at a slower rate, so that successive extrusion of the fluid parison occurs during such upward movement. At the same time, air or gas, in a compressed state, is forced into the cavity of the parison via air passageway 144 to cause expansion of the extrudate to conform to the bottle mold cavity. In this instance, the die orifice 1 is the clearance between the lower portion of blow plunger 140 and the walls of parison forming cavity 134.

Here also, the blow plunger is continuously rotated during the bottle forming operation with a level of torque sufficient to place a strain upon the molecules of the plastic being extruded. Such strain imparts a multidirectional orientation to the molecules and hence a multidirectional strong bottle 146 is formed.

It should be evident from the illustration in FIGS. 13 through 16, that the apparatus could be used to form different height bottles. In such instance, the bottle mold 130 must be of sufficient height and the piston 132 must have sufficient reciprocal motion to provide for such variation in bottles. Thus, by merely varying the stroke of the piston 132 between production lots, one can produce bottles of various sizes.

FIGS. 17 through 20 illustrate still another method and apparatus. Here, granulated polymer may likewise be utilized. Or else a solid cup-shaped parison may be used.

To commence the making of bottles, the operator or the apparatus pours granulated polymer 170 into the neck forming cavity 172 of blow mold 2. The floor of the cavity 172 consists of a parison support piston 174. After a proper amount of raw plastic is fed into cavity 172, blow plunger 176 travels downwardly and compresses the granulated polymer into a parison 178 (FIG. 18). Then both the blow plunger 176 and the parison support piston 174 travel downwardly with the same relative speed until the bottom of the bottle is reached. During such movement, the parison is extruded into the bottle mold cavity 180 and blown with compressed air or gas from air passageway 179 to cause the extrudate to eventually conform to the internal surface of cavity 180 of the bottle mold 2. Simultaneous therewith, the blow plunger rotates with a level of torque to cause orientation of the molecules of the plastic being extruded. As above, a strong flash-free bottle is formed.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described, what I claim as new and desire to secure by Letters Patent is:

1. A method for blow molding hollow thermoplastic articles whereby multidirectional orientation is imparted to the molecules of said thermoplastic for multidirectional strength comprising
    placing a body of thermoplastic out of which said article is to be formed within a cavity having an open end within a blow mold, forcing a blow plunger against said body of thermoplastic,
    progressively extruding a portion of said parison through an annular die orifice while rotating at least one lip element of said orifice with a torque sufficient to impart multidirectional orientation to the molecules of the thermoplastic being extruded.
    and blowing said extruded portion outwardly to conform to the walls of said blow mold,
    whereby a blow molded object of multidirectional strength will be formed.

2. A method for blow molding hollow thermoplastic articles whereby multidirectional orientation is imparted to the molecules of said thermoplastic for multidirectional strength comprising
    confining a solid rod-like parison within a cavity having an open-end within a blow mold,
    forcing a blow plunger against said parison to cause progressive extrusion of said parison out of the open end of said cavity while rotating said blow plunger with a torque sufficient to impart multidirectional orientation to the molecules of the thermoplastic being extruded,
    and blowing said extruded portion outwardly to conform to the walls of said blow mold,
    whereby a blow molded object of multidirectional strength will be formed.

3. A method for blow molding hollow thermoplastic articles whereby multidirectional orientation is imparted to the molecules of said thermoplastic for multidirectional strength comprising
    confining granular thermoplastic out of which said article is to be formed within a cavity having an open end within a blow mold,
    forcing a blow plunger against said granular thermoplastic to cause impact molding into a parison,
    progressively extruding said parison out of the open end of said cavity by means of said blow plunger while rotating said blow plunger with a torque sufficient to impart multidirectional orientation to the molecules of the thermoplastic being extruded,
    and blowing the extruded portion outwardly to conform to the walls of said blow mold,
    whereby a blow molded object of multidirectional strength will be formed.

4. A method for blow molding hollow thermoplastic articles whereby multidirectional orientation is imparted to the molecules of said thermoplastic for multidirectional strength comprising
    confining granular thermoplastic out of which said article is to be formed within a cavity having an open end within a blow mold,
    forcing a blow plunger against said granular thermoplastic to cause impact molding into a parison,
    positioning a support against said impact molder parison at said open end,
    progressively extruding said parison out of the open end of said cavity by means of said blow plunger while rotating said blow plunger with a torque sufficient to impart multidirectional orientation to the molecules of the thermoplastic being extruded,
    and blowing the extruded portion outwardly to conform to the walls of said blow mold,
    whereby a blow molded object of multidirectional strength will be formed.

5. Apparatus for blow molding hollow thermoplastic articles of multidirectional strength comprising;
    a blow mold with a cavity therein,
    means for confining raw thermoplastic, said means opening into the cavity of said blow mold and comprising a hollow tubular parison cylinder which is reciprocally mounted within said cavity,
    blow means which partially block opening of said parison cylinder, said blow means being reciprocally mounted within said cavity whereby an annular die orifice is continuously effected between said parison cylinder and said blow means as said elements reciprocate within said blow mold cavity,
    rotating means operatively connected to said blow means for rotating said blow means with a torque sufficient to impart multidirectional orientation to the molecules of said thermoplastic,
    extrusion means to extrude said thermoplastic out through said annular die orifice into said blow mold while said blow means are being rotated and
    supply means for said blow means to blow said thermoplastic, as it is extruded, to conform to said cavity of said blow mold,
    whereby a hollow thermoplastic article of multidirectional strength can be produced.

6. Apparatus for blow molding hollow thermoplastic articles of multidirectional strength comprising:

a blow mold formed of a cup-shaped cylinder and a reciprocal piston therein and defining a variable blow mold cavity therebetween, a parison cavity axially located within said piston and opening into said blow mold cavity only when said piston is spaced from the bottom of said cup-shaped cylinder, blow plunger means capable of entering and reciprocally moving within said parison cavity to act as an impact mold plunger to form a parison and as an extrusion plunger to extrude the formed parison, to lower portion of said blow plunger being spaced from the walls of said parison cavity whereby a uniform annular die orifice may be effected between said walls and said lower portion of said blow plunger, rotating means operatively connected to said blow plunger means for rotating said blow plunger means with a torque sufficient to impart multidirectional orientation to the molecules of said thermoplastic, impact mold force applying means for said plunger whereby raw granulated thermoplastic within said parison cavity may be formed into a parison, extrusion force applying means for said plunger whereby said parison may be successively extruded out through said annular die orifice into said blow mold cavity while said plunger means are being rotated and supply means for said blow plunger means to blow said extruded parison to conform to said cavity of said blow mold, whereby a hollow thermoplastic article of multidirectional strength can be produced.

7. Apparatus for blow molding hollow thermoplastic articles of multidirectional strength comprising:

a blow mold with a cavity therein, a portion of said cavity acting as a parison cavity, a parison support piston reciprocally mounted within said blow mold and capable of providing a floor support to said parison cavity, means to reciprocate said parison support piston, blow plunger means capable of entering and reciprocally moving within said parison cavity to act as an impact mold plunger to form a parison and as an extrusion plunger to extrude the formed parison, the lower portion of said blow plunger being spaced from the walls of said parison cavity whereby a uniform annular die orifice may be effected between said walls and said lower portion of said blow plunger, rotating means operatively connected to said blow plunger means with a torque sufficient to impart multidirectional orientation to the molecules of said thermoplastic, impact mold force applying means for said plunger whereby raw granulated thermoplastic within said parison cavity may be formed into a parison, extrusion force applying means for said plunger whereby said parison may be successively extruded out through said annular die orifice into said blow mold cavity while said plunger means are being rotated and supply means for said blow plunger means to blow said extruded parison to conform to said cavity of said blow mold, and said reciprocating means for said parison support piston having means to reciprocate said piston away from said extruded and blow parison.

References Cited by the Examiner

UNITED STATES PATENTS

| 2,706,308 | 4/1955 | Lorenz | 264—97 |
| 3,059,277 | 10/1962 | Pierce et al. | 18—14 |
| 3,109,198 | 11/1963 | Guignard | 18—30 X |

FOREIGN PATENTS

| 878,105 | 4/1953 | Germany. |
| 889,976 | 6/1953 | Germany. |
| 703,970 | 2/1954 | Great Britain. |

ROBERT F. WHITE, *Primary Examiner.*

J. A. FINLAYSON, *Assistant Examiner.*